(12) United States Patent
Illy

(10) Patent No.: US 6,318,127 B1
(45) Date of Patent: Nov. 20, 2001

(54) METHOD OF GLASS MANUFACTURE INVOLVING SEPARATE PREHEATING OF COMPONENTS

(75) Inventor: Fabien S. Illy, Chaville (FR)

(73) Assignees: L'Air Liquide, Societe Anonyme pour l'Etude et, l'Exploitation des Procedes Georges Claude, Paris (FR); American Air Liquide, Inc., Fremont, CA (US)

( * ) Notice: Subject to any disclaimer, the term of this patent is extended or adjusted under 35 U.S.C. 154(b) by 0 days.

(21) Appl. No.: 09/373,746

(22) Filed: Aug. 13, 1999

(51) Int. Cl.$^7$ ........................................................ C03B 1/00
(52) U.S. Cl. ........................... 65/136.1; 65/27; 65/135.9; 373/33; 373/34; 209/11
(58) Field of Search ................... 65/27, 135.9, 136.1; 373/33, 34; 209/11

(56) References Cited

U.S. PATENT DOCUMENTS

| | | | |
|---|---|---|---|
| 2,114,545 | * | 4/1938 | Slayter . |
| 4,374,660 | * | 2/1983 | Sakhuja et al. . |
| 5,123,942 | * | 6/1992 | Argent et al. . |
| 5,125,943 | * | 6/1992 | Cole . |
| 5,741,342 | * | 4/1998 | Alexander . |

* cited by examiner

*Primary Examiner*—Michael Colaianni
(74) *Attorney, Agent, or Firm*—Burns, Doane, Swecker and Mathis LLP

(57) ABSTRACT

Provided herewith is a method for preheating a glass mixture to be fed into a glass furnace. The method comprises separately preheating at least some of the materials which comprise the load, and then subsequently remixing the preheated materials and passing the load to the glass furnace.

10 Claims, 5 Drawing Sheets

METHOD OF GLASS MANUFACTURE INVOLVING SEPARATE PREHEATING OF COMPONENTS

BACKGROUND OF THE INVENTION

1. Field of Invention

The field of technology of the invention is glass manufacturing, and more especially the efficient melting of raw materials in a glass furnace. More particularly, the present invention relates to a method of manufacturing glass involving a process for preheating the components of the furnace load.

2. Brief Description of the Related Art

As glass manufacturing is one of the most energy intensive industries, the improvement of thermal efficiency of furnaces is an important issue. One known technique to increase the efficiency of a glass melting furnace is the recovery of the heat contained in the flue gas. The energy recovered can be used for example to preheat the furnace load, and thus reduce the energy requirement of the process. In the container glass industry, a vertical batch and cullet preheater has been described in U.S. Pat. No. 5,526,580, as exemplified by the commercial indirect preheater from Zippe of Germany. The proceeding of 1992 Thermie Seminar in Weisbaden also contained a description of a direct preheater from Interprojekt (formerly GEA). The drawbacks of these techniques lay in the fact that they are not suitable for all glass compositions, and are not suitable for all types of raw materials fed into the preheater.

Glass manufacturing involves the preparation of the raw material mixture (or load), the feeding of the raw material mixture into a furnace, the heating of the raw material mixture, its melting and fining. The raw materials include the components that are needed to produce glass of a desired composition. The mixture of non-transformed raw materials that is ready to be molten in the furnace, is referred to as the batch, which may have been wetted, mixed, or sorted. The batch is, for example, a wet mixture of sand, soda ash, limestone, etc. Cullet refers to already molten glass, either recycled from the plant (plant cullet), recycled from other plants or industries, or from post-consumers glass sources (outside or foreign cullet). The load will refer to the material actually fed into the furnace, which may include batch, cullet or additive.

Reacting materials are defined by the fact that they may react while they undergo preheating. Pre-reactions include degasing ($CO_2$, $N_2$, Steam, $SO_2$ or other gases), melting (boric acid and boric oxide melting point is as low as 185° C. and 300° C.), chemical reactions (calcining -decomposition of the carbonates to oxides with $CO_2$ release- or silica and soda ash reactions to produce sodium metasilicate) and important changes in the mechanical or physical properties of the material. Reacting materials may be found in any type of material, raw material, batch, cullet or load. The generic term "material" will apply to any of the components (raw material, reacting material, batch, cullet or load) described above or a mixture of thereof.

Cullet preheating is a well known technique. It is described, for example, in U.S. Pat. No. 5,556,443 (direct preheater from Edmeston of Sweden). A batch can also be preheated, but the presence of water in the batch, and the chemical reactions that occur while the batch heats up (gases release from soda ash or limestone, steam evaporation, partial melting), turn the material into a sticky mixture when it is preheated. As it is difficult to heat up the batch by itself, it is often mixed with cullet to be preheated, with a typical minimum weight ratio of cullet of 50% for efficient preheating. The mixture of cullet and batch can go through the material preheater and be preheated to 500–550° C. maximum. Beyond this temperature, the cullet will also become too sticky to sustain further heating.

U.S. Pat. No. 5,713,977 describes load preheating in order to avoid the problems of particle entrainment and load reaction. Particle entrainment is addressed by creating a filter using the load.

To ensure a good glass quality, homogeneity of the melt is required. The careful and thorough mixing of the cold batch prior to charging into a conventional furnace is a common way to ensure good homogeneity in the glass bath. It limits the material preheating of the load, however, because if the load has a low weight fraction of cullet, as for example in fiber glass production or a float glass furnace, or has a component with a low melting point, such as boron for a borosilicate glass composition, it cannot be preheated in the existing material preheaters. The current possibility of material preheating and energy savings in such glass furnaces is therefore restricted and limited.

The glass industry would be well served by a method which allowed for energy efficient preheating even when the cullet fraction of the load is small. It is therefore an object of the present invention to provide such a method.

This and other objects of the present invention will become apparent to the skilled artisan upon a review of the following description, the drawing and the claims appended thereto.

SUMMARY OF THE INVENTION

The present invention provides a method and apparatus to preheat material even when the cullet fraction of the load is small. Whereas in conventional batch preparation techniques the batch is carefully homogenized, in the present invention, the raw materials are not mixed, but instead, some or all of its components are preheated separately in one or more heat exchangers with hot gases. The hot gases may be the flue gas from the furnace or another hot gas or fluid. The hot material will then be fed into the furnace.

An important aspect of the present invention, among other features, is that some of the materials composing the load will be preheated separately from the other components composing the load. In this way, each component may be preheated according to its physical characteristics (density, size, reactivity, thermal behavior), and accordingly be preheated more efficiently (to a higher temperature). As some water is added during the conventional preparation of the batch, the separate preheating allows one to allow limit the quantity of water that it is introduced in the melter. Evaporating the water increases the energy required to produce the glass.

DETAILED DESCRIPTION OF PREFERRED EMBODIMENTS

The main components of glass are silica, alumina, iron oxides, calcia, magnesia, soda and other minor ingredients such as borate, iron chromite or various oxides. For example, note Table 1 below:

TABLE 1

Approximate weight compositions typical of some commercials glasses (from the Handbook of Glass Manufacture, 3d edition, Dr. Tooley)

| Glass | $SiO_2$ | $Al_2O_3$ | $Fe_2O_3$ | CaO | MgO | $Na_2O$ | $B_2O_3$ |
|---|---|---|---|---|---|---|---|
| Container flint | 73.0 | 1.7 | 0.05 | 10.4 | 1.2 | 13.2 | |
| Fiber Glass | 54.5 | 14.5 | 0.4 | 15.9 | 4.4 | 0.5 | |
| Borosillicate (USP Type I) | 81.0 | 2.5 | | | | 4.5 | 10.0 |

These components come from raw materials like sand, soda ash, limestone, salt cake, dolomite (or raw limestone) and feldspar, compositions of which are given in the following table:

TABLE 2

Main components of some raw glass material

| Material | main components |
|---|---|
| Sand | 99.5% $SiO_2$ |
| Soda ash | 58.5% $Na_2O$ |
| limestone | 56.0% CaO and MgO |
| Dolomite | 30.4% CaO and 21.8% MgO |
| Salt Cake | 43.7% $Na_2O$ |
| Feldspar | 18% $Al_2O_3$, 13% $K_2(Na_2)O$ and 68% $SiO_2$ |

A typical weight composition of a container glass material is: sand 56.5%, soda Ash 19.6%, limestone 8.6%, dolomite 9.8% and feldspar 5.3%. The remaining non accounted elements of the batch, are minor components or additives to achieve a good color, fining, or optical property of the glass product. In fact, the two main components that cause most of the problems for batch preheating are soda ash and limestone because they generate material loss (around 42% of their weight) and release gas ($CO_2$) when they are preheated.

Figure 1:
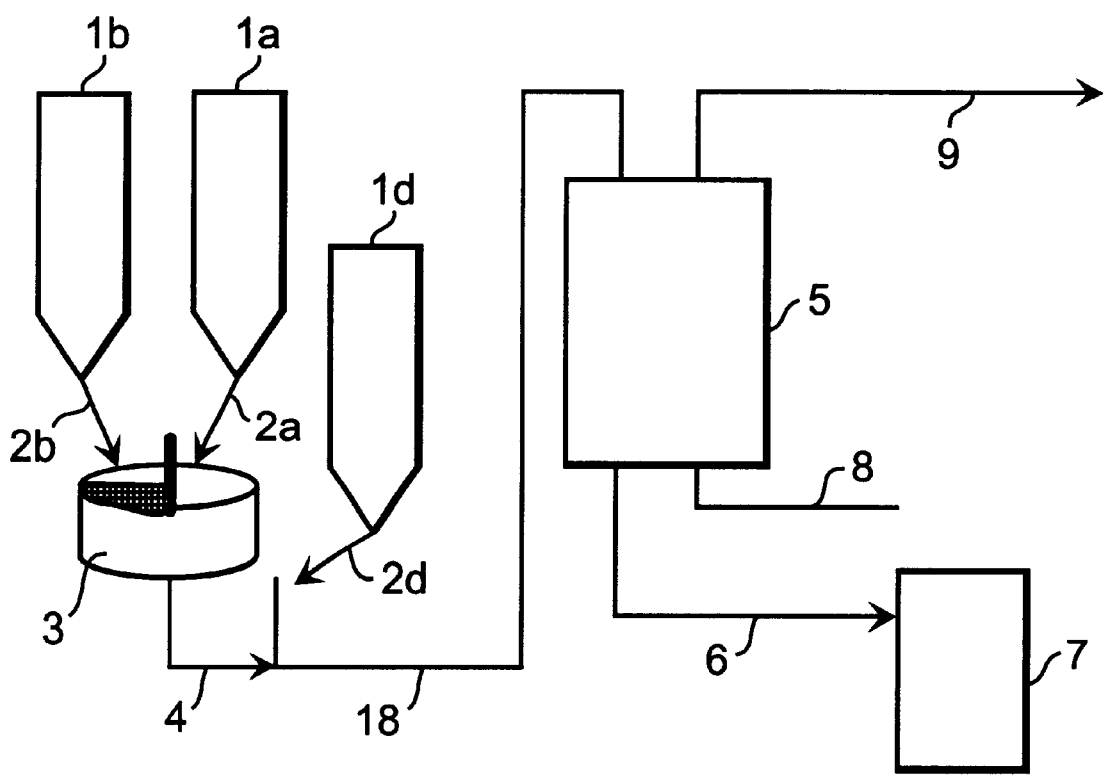
FIG. 1 schematically depicts a prior art method.

A prior art method is depicted in FIG. 1 to show the differences with the method of the present invention. The raw materials (sand 2a from the bunker 1a and other material 2b from the bunker 1b) are mixed in the mixer 3 to form batch 4. The batch 4 is mixed with cullet 2d from the bunker 1d and the load 18 conveyed to the preheater 5 where it is preheated by hot gases 8. The hot load 6 from the preheater is then fed into the furnace 7. The hot gases leave the heat exchanger at a reduced temperature 9.

It is an object of this invention to allow material preheating for all glass furnaces even in the case of low cullet ratio load or when a component with a low melting point enters in the composition of the batch. This object is achieved by a method that comprises the following steps:

(a) Each material to be preheated is separated from other materials; it may be used under its raw form (unmixed), or it may be sorted from a raw material mixture, a batch or a load;

(b) Each material to be pretreated is preheated separately according to its size, physical or chemical characteristics in a suitable material preheater; and (c) The preheated materials and the non preheated material are combined to form the load of the glass melter, combining might occur inside the melter or in a suitable apparatus before the melter.

The cullet can be preheated alone or with a fraction of the batch using one of the heat exchangers commercially available. In the described methods of the invention, the hot cullet (or hot cullet and batch) can therefore be mixed with the preheated material to form the load before the furnace or be fed directly in the furnace. It is preferred that less than 40–50% by weight of the load comprises cullet.

Figure 2:
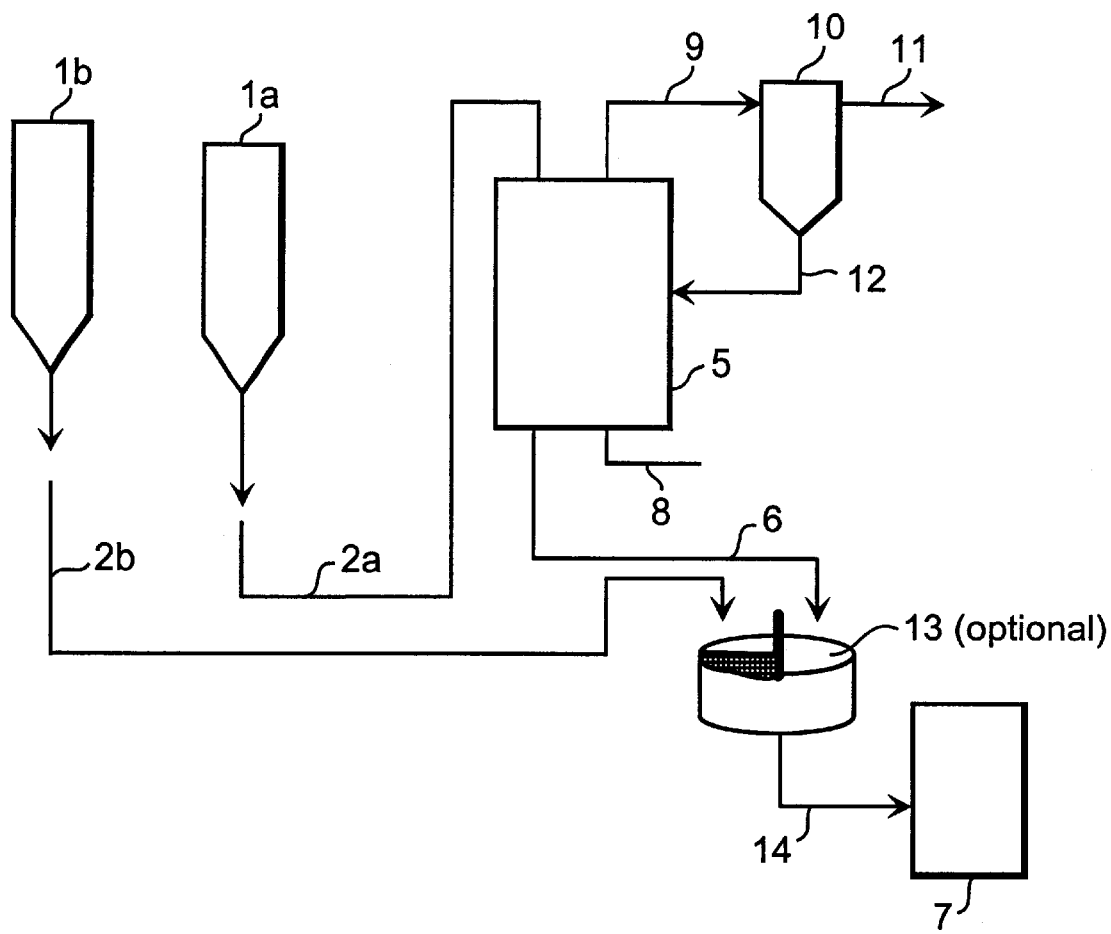
FIG. 2 schematically depicts a method of the present invention involving separate preheating of the material components.

In one preferred embodiment, a method to preheat separately material components of the load is disclosed when the materials are sands: Alumina Sand, Silica Sand or a mixture of thereof. The process is illustrated in FIG. 2. Sand 2a from the bunker 1a is preheated in the preheater 5 by the hot gases 8. The hot material 6 can be mixed (optional) in the mixer 13 and the mixture 14 being then fed into the furnace 7. Silica, which composes most of the sands of the above (99% of Silica Sand, 85% of Alumina Sand) has a high melting point (over 1400° C.). The presence in the preheater of mainly sands, would allow one to achieve a high preheating temperature without any pre-reacting limitations due to other elements. Where typically material can be preheated up to 400° C., here it is possible to preheat sand up to 600–650° C. with conventional preheaters and over 1000° C. with ceramic preheaters. There are many techniques that can be used to heat sand with a hot gas.

A preferred apparatus is a fluidized bed heat exchanger. The fluidized bed is mainly used to create a fluidized combustion bed with waste, coal or other various sized elements. Here, because the sand has a rather homogenized size compared to a normal batch, a fluidized bed is easier to design. The hot gases flow upward while the sand goes downward to be collected at the bottom. The hot gases can be either the melter flue gases, a mixture of melter flue gases or an intermediate gas such as air, combustion product, or other, preheated with a hot flue gas. An advantage of having the flue gas flowing through the sand is that volatile species may be captured. A dust collector apparatus 10, like a cyclone, is preferably located on the hot gas outlet 9 to remove dust and sand particles 12 that could have been entrained, the cleaned gases 11 can then be treated or vented.

Another preferred apparatus is a vertical heat exchanger where the material goes downward by gravity, and exchanges heat with a hot gas. An example of such heat exchanger is baffled heat exchangers, to achieve good contact between hot gas and the sand in a counter current heat exchange, as such those commercially used to preheat batch and cullet mixture. The heat exchanger can be of the direct or indirect type. Another preferred apparatus is a fixed bed heat exchanger, that would be useful in the case of a batch charging furnace. After being preheated the hot sand will be collected and can thereafter be mixed with the other materials, preheated or not, to compose the load of the melter or fed directly into the melter.

Figure 4:
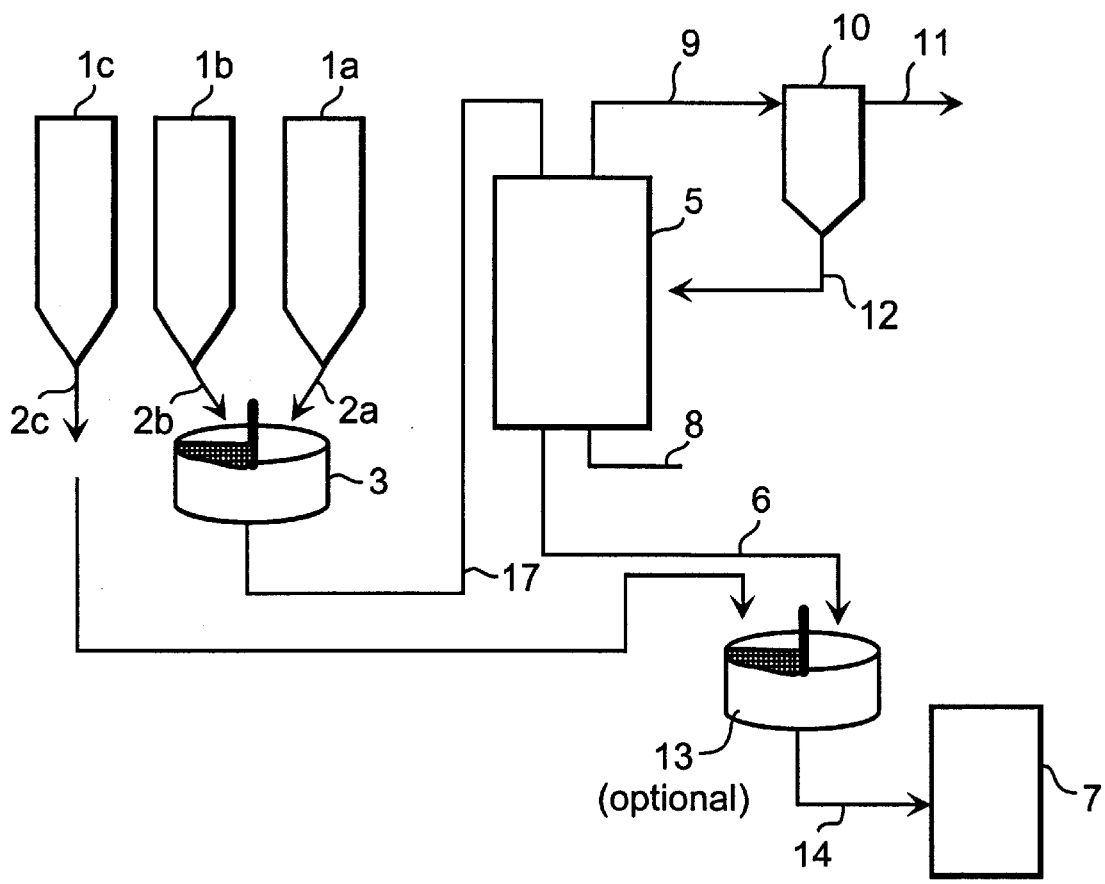
FIG. 4 schematically depicts another embodiment of the present invention.

In another preferred embodiment, a method is provided to preheat separately material components of the load when the components comprise a mixture of raw materials which does preferably not include a large part of reacting materials. Known reacting material are either sorted from the batch or not mixed with the materials to be preheated. FIG. 4 of the Drawing illustrates this latter method.

Known reacting components are not mixed with sand 2a and other components 2e (that may comprise a small amount of reacting elements). The mixture of material component 17 which does preferably not include a large part of reacting material is thereafter preheated. Therefore, the preheater 5 will have only to deal with a limited amount of non-reacting material. The heat exchangers comprises the heat exchanger mentioned previously. After being preheated, the hot mixture 6 is collected and can thereafter be mixed with the reacting material 2c from bunker 1c that was not preheated to form the furnace load 14, or it can be fed directly into the melter.

Figure 3:
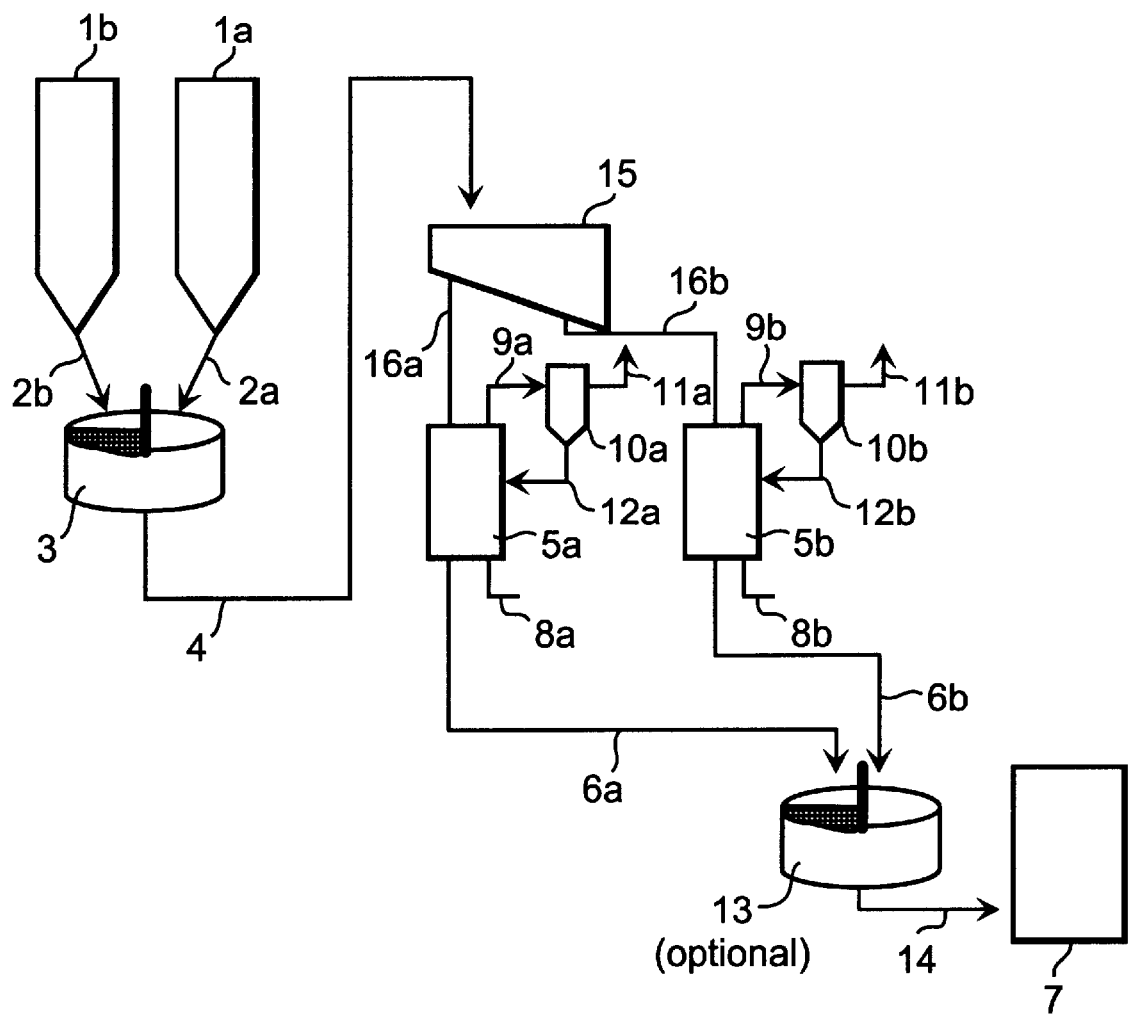
FIG. 3 schematically depicts another embodiment of the present invention.

In a third preferred embodiment, a method is disclosed to preheat separately material components sorted from a batch, wet or not, according to the size of its elements. The method is useful when a material preheater is needed and when the batch or load has already been mixed. The method is illustrated in FIG. 3 of the Drawing.

The batch 4 is prepared from sand 2a and other components 2b in the mixer 3. The fines are sorted in the apparatus 15 from the more coarse particles. Sorting the batch is preferably done by mechanical screening. A less preferred method may include gravity sorting, speeding up the natural segregation phenomena during storage, bunker flowing or discharge. The sorted batch element will for example be divided into fines 16a and coarse material 16b. The coarse material and the fines may then be preheated separately in separate heat exchangers (5a and 5b) designed according to the size of each element. Flue gas streams 8a and 8b are used to preheat fines and coarse material, respectively. The heat exchangers that may be suitable for this process include the heat exchangers described above. The coarse particle may be mixed with some cullet to be preheated and to allow the cullet to be preheated with them. The cullet can also be crushed and sorted with the batch and thus preheated at the same time. After being preheated, the hot fines 6a and coarse material 6b are collected, and can thereafter be mixed together in the mixer 13. If some materials were not preheated, they can also be mixed at this point with the hot material 14. The preheated material can also be fed directly into the melter. Dust collectors 10a and 10b are provided, collector 10a receiving hot gas 9a and discharging sand particles 12a and clean gases 11a. Dust collector 10b receives hot gas 9b and discharges sand particles 12b and clean gas 11b.

The following example is provided to further illustrate the present invention, but is in no way meant to be limiting. All percentages in the examples, and the rest of the description, are by weight unless stated otherwise.

EXAMPLE

Figure 5:
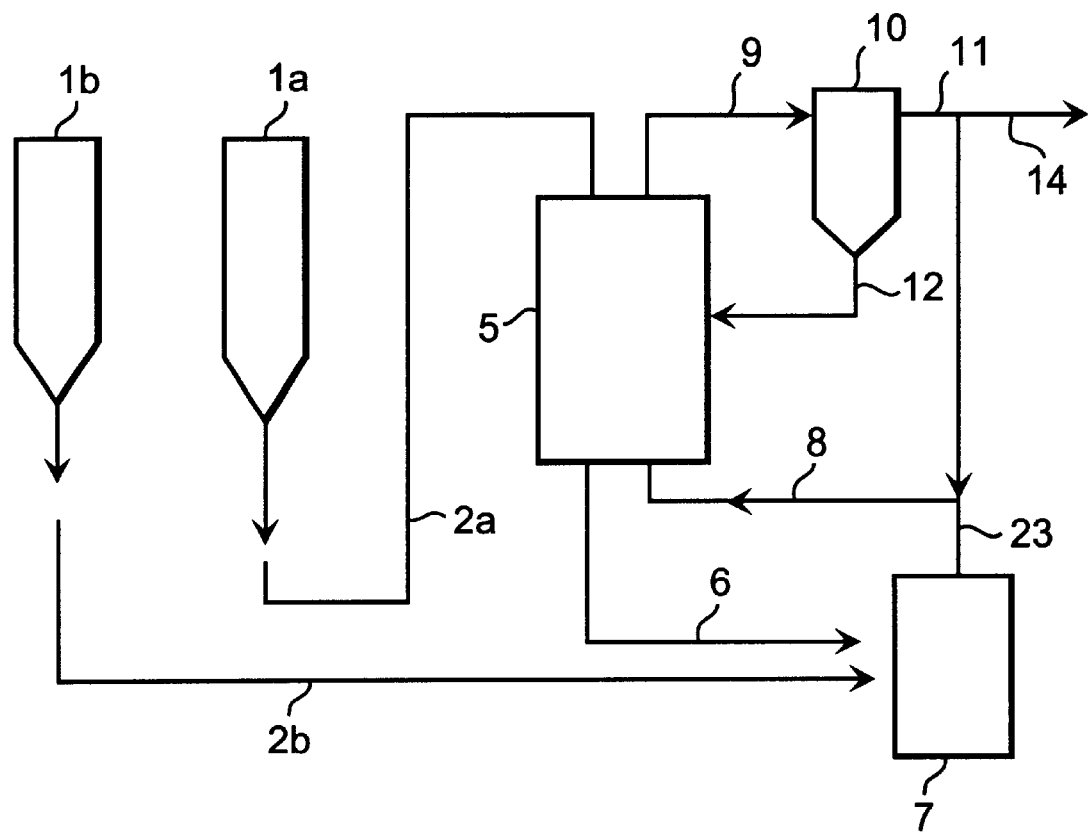
FIG. 5 schematically depicts an embodiment of the present invention employed in the Example.

This example is provided to demonstrate the utility of the invention in the case of load for glass furnaces with a low cullet mass fraction. The method used is depicted schematically in FIG. 5 of the Drawing. The glass is a soda-lime glass, but as the sensible heat of the material of glass is rather the same because of the large proportion of sand which is common to every type of glass, these results may be applied to other types of glasses with only minor modifications.

In order to achieve a good quality product without mixing the raw material component before the melter, the method of preheating separate component of the raw glass material will be applied to a submerged combustion oxygen melter. Such a melter presents a high turbulence level in the melt that will ensure homogeneity. The hot gases 8 used in the preheater will be flue gas 23 from the furnace 7, whose temperature 1400° C. has been lowered to 600° C. not to damage the preheater by recirculating and mixing a fraction of the clean exhaust gas 11 after the cyclone 10. With state of the art preheater technology a typical temperature that can be as high 400° C. but the typical temperature is more in the range of 280–320° C. The theoretical savings at the maximum temperature, if all the material can be heated, is 24.6%, and the mass energy that enter the melter with the preheated load is 217 Btu/lb.

With only 20% cullet, the common material preheater commercially available cannot be used to preheat completely the load. If we preheat only the cullet (20% of the total weight), we will save 4.92% of fuel with 43.5 Btu/lb. By using a common batch/cullet preheater we could mix as much batch as we have cullet, that means we could preheat 40% of the total weight and save 9.84% at 87.0 Btu/lb. By using the sand preheater described in the first preferred embodiment at the same temperature (400° C.), we could preheat 60% of the non cullet material, or 50% of the total weight. The savings will reach 10.20% at 90.2 Btu/lb. At a higher temperature (500° C. for example) the savings rise to 12.20% at 107.8 Btu/lb.

If no cutlet were present, one could preheat 60% of the load at 400° C. or 500° C. and save respectively 12.2% at 108.2 Btu/lb and 14.6% at 129.4 Btu/lb.

While the invention has been described with preferred embodiment, it is to be understood that variations and modifications may be resorted to as will be apparent to those skilled in the art. Such variations and modifications are to be considered within the purview and scope of the claims appended hereto.

What is claimed is:

1. A method for preheating a load, composed of materials, for a glass furnace comprising the steps:

separating at least one of the materials in the load in its raw form;

preheating each separated raw material separately from the other separated raw materials of the load; and subsequently mixing the various preheated raw materials together to form a mixed preheated load and passing the mixed preheated load to the glass furnace.

2. The method of claim 1, wherein the materials are separated according to their physical characteristics.

3. The method of claim 1, wherein the materials are sorted according to size.

4. The method of claim 1, wherein said materials further comprise some cullet which is also separated and separately preheated.

5. The method of claim 4, wherein the preheated cullet is remixed with the raw materials of the load and passed to the glass furnace.

6. The method of claim 1, wherein materials preheated include substantially no cullet.

7. The method of claim 1, wherein the materials are preheated in a circulating or fluidized bed.

8. The method of claim 7, wherein the materials are preheated in a fluidized bed.

9. The method of claim 1, wherein the step of separating comprises separating batch from cullet.

10. The method of claim 1, wherein the step of separating comprises separating raw materials based on a chemical characteristic.

* * * * *